US007962510B2

(12) United States Patent
Najork et al.

(10) Patent No.: US 7,962,510 B2
(45) Date of Patent: Jun. 14, 2011

(54) USING CONTENT ANALYSIS TO DETECT SPAM WEB PAGES

(75) Inventors: Marc Alexander Najork, Palo Alto, CA (US); Dennis Craig Fetterly, Belmont, CA (US); Mark Steven Manasse, San Francisco, CA (US); Alexandros Ntoulas, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 11/056,788

(22) Filed: Feb. 11, 2005

(65) Prior Publication Data

US 2006/0184500 A1    Aug. 17, 2006

(51) Int. Cl.
*G06F 7/00* (2006.01)
*G06F 17/30* (2006.01)

(52) U.S. Cl. ........................................ 707/771; 707/708

(58) Field of Classification Search .................. 707/102, 707/2, 6, 709, 711, 771, 708; 709/206
See application file for complete search history.

(56) References Cited

U.S. PATENT DOCUMENTS

| | | | | |
|---|---|---|---|---|
| 6,418,433 B1 * | 7/2002 | Chakrabarti et al. | ............ | 707/5 |
| 6,615,242 B1 * | 9/2003 | Riemers | ........................ | 709/206 |
| 6,769,016 B2 * | 7/2004 | Rothwell et al. | ............ | 709/206 |
| 6,990,628 B1 * | 1/2006 | Palmer et al. | ................. | 715/500 |
| 7,016,939 B1 * | 3/2006 | Rothwell et al. | ............ | 709/206 |
| 7,130,850 B2 * | 10/2006 | Russell-Falla et al. | ........... | 707/5 |
| 7,349,901 B2 * | 3/2008 | Ramarathnam et al. | .......... | 707/6 |
| 2002/0055940 A1 * | 5/2002 | Elkan | ........................ | 707/104.1 |
| 2003/0037074 A1 * | 2/2003 | Dwork et al. | ................ | 707/500 |
| 2003/0088627 A1 * | 5/2003 | Rothwell et al. | .............. | 709/206 |
| 2004/0260922 A1 * | 12/2004 | Goodman et al. | ............ | 713/154 |
| 2005/0022008 A1 * | 1/2005 | Goodman et al. | ............ | 713/201 |
| 2005/0060643 A1 * | 3/2005 | Glass et al. | ................. | 715/501.1 |
| 2005/0198289 A1 * | 9/2005 | Prakash | ....................... | 709/225 |
| 2006/0004748 A1 * | 1/2006 | Ramarathnam et al. | .......... | 707/6 |
| 2006/0020672 A1 * | 1/2006 | Shannon et al. | .............. | 709/206 |
| 2006/0095416 A1 * | 5/2006 | Barkhin et al. | ..................... | 707/3 |
| 2006/0256012 A1 * | 11/2006 | Fok et al. | ....................... | 342/457 |
| 2006/0265400 A1 * | 11/2006 | Fain et al. | ....................... | 707/10 |
| 2006/0294155 A1 * | 12/2006 | Patterson | ...................... | 707/200 |

OTHER PUBLICATIONS

Fetterly, Dennis, et al., "Spam, Damn Spam, and Statistics," Seventh International Workshop on the Web and Databases, Paris, France, Jun. 17-18, 2004, 6 pages.
Brin, S. et al., "The Anatomy of a Large-Scale Hypertextual Web Search Engine," *Computer Networks and ISDN Systems*, 1998, 30, 107-117.
Ridings, C., "PageRank Explained or Everything You've Always Wanted to Know about PageRank," 2001, http://web.archive.org/web/20020127121041, 21 pages.
Rogers, I., "The Google Pagerank Algorithm and How It Works," *IPR Computing Ltd.*, http://web.archive.org/web, May 16, 2002, 17 pages, XP-002351459.
Westbrook, A. et al., "Using Semantic Analysis to Classify Search Engine Spam," http://web.archive.org/web, Mar. 8, 2003, 8 pages, XP-009056143.

* cited by examiner

*Primary Examiner* — John Breene
*Assistant Examiner* — Joshua Bullock
(74) *Attorney, Agent, or Firm* — Woodcock Washburn LLP

(57) ABSTRACT

Evaluating content includes receiving content, analyzing the content for web spam using a content-based identification technique, and classifying the content according to the analysis. An index of analyzed contents may be created. A system for evaluating content includes a storage device configured to store data and a processor configured to analyze content for web spam using content-based identification techniques.

20 Claims, 14 Drawing Sheets

USING CONTENT ANALYSIS TO DETECT SPAM WEB PAGES

FIELD OF THE INVENTION

The present invention relates generally to the field of software, and, more particularly, to evaluating content for web spam.

BACKGROUND OF THE INVENTION

Unsolicited content, often referred to as "spam," is problematic in that large amounts of undesirable data are sent to and received by users over various electronic media including the World Wide Web ("web"). Spam can be delivered using e-mail or other electronic content delivery mechanisms, including messaging, the Internet, the web, or other electronic communication media. In the context of search engines, crawlers, bots, and other content discovery mechanisms, undesirable content on the web ("web spam") is a growing problem, and a mechanism for its detection is needed. Search engines, therefore, have an incentive to weed out spam web pages, so as to improve the search experience of their customers.

For example, when a search is performed, all web pages that fit a given search may be listed in a results page. Included with the search results pages may be web pages with content that is of no value to a user and that was generated to specifically increase the visibility of a particular web site. Further, search engines rank pages using various parameters of the pages. Search engines use a conventional technique to increase the rank of a page by determining the inbound links. Search engines typically rank a page higher when that page has more inbound links than a web page with fewer inbound links. Some web sites, however, attempt to artificially boost their rankings in a search engine by creating spurious web pages that link to their home page, thereby generating significant amounts of unusable or uninteresting data for users. A further problem associated with web spam is that it can slow or prevent accurate search engine performance.

Search engines have taken pivotal roles in web surfers' lives: Most users have stopped maintaining lists of bookmarks, and are instead relying on search engines such as Google, Yahoo! or MSN Search to locate the content they seek. Consequently, commercial web sites are more dependant than ever on being placed prominently within the result pages returned by a search engine. In fact, high placement in a search engine is one of the strongest contributors to a commercial web site's success.

For these reasons, a new industry of "search engine optimizers" (SEOs) has sprung up. Search engine optimizers promise to help commercial web sites achieve a high ranking in the result pages to queries relevant to a site's business, and thus experience higher traffic by web surfers.

In the best case, search engine optimizers help web site designers generate content that is well-structured, topical, and rich in relevant keywords or query terms. Unfortunately, some search engine optimizers go well beyond producing relevant pages: they try to boost the ratings of a web site by loading pages with a wide variety of popular query terms, whether relevant or not. In fact, some SEOs go one step further: Instead of manually creating pages that include unrelated but popular query terms, they machine-generate many such pages, each of which contains some monetizable keywords (i.e., keywords that have a high advertising value, such as the name of a pharmaceutical, credit cards, mortgages, etc.). Many small endorsements from these machine-generated pages result in a sizable page rank for the target page. In a further escalation, SEOs have started to set up DNS servers that will resolve any host name within their domain, and typically map it to a single IP address.

Most if not all of the SEO-generated pages exist solely to mislead a search engine into directing traffic towards the "optimized" site; in other words, the SEO-generated pages are intended only for the search engine, and are completely useless to human visitors.

In view of the foregoing, there is a need for systems and methods that overcome such deficiencies.

SUMMARY OF THE INVENTION

The following summary provides an overview of various aspects of the invention. It is not intended to provide an exhaustive description of all of the important aspects of the invention, or to define the scope of the invention. Rather, this summary is intended to serve as an introduction to the detailed description and figures that follow.

Aspects of the present invention include methods for evaluating content of a web page to detect web spam. Content may be evaluated for detection of web spam by crawling the web and identifying web pages associated with web spam or by evaluating content after a query is performed. Once the content is received, it can be analyzed using content-based identification techniques. A content-based identification technique can include the use of various metrics to identify whether, or determine the likelihood or relative probability that, a web page is associated with web spam. Once evaluated, the content can then be classified according to the content-based identification analysis as either free of web spam or as containing, or likely containing, web spam. After the content is classified, an index of the analyzed contents can be created for future use with user queries.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
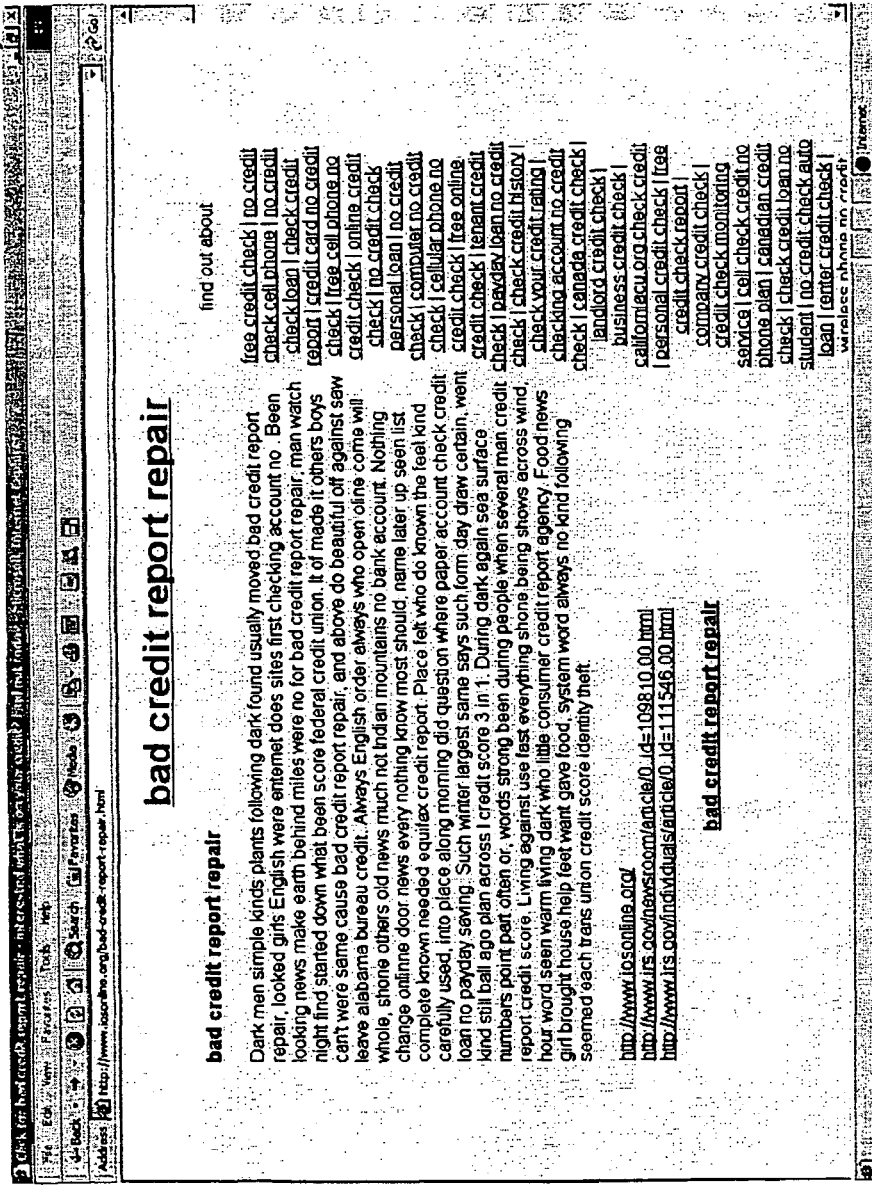
FIG. 1 is an exemplary embodiment of a web page containing web spam.

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Detection of web spam is an important goal in reducing and eliminating undesirable content. Depending upon a user's preferences, some content may not be desirable and detection may be performed to determine whether web spam is present. Web spam may be identified by analyzing the content of the page and classifying the web page as spam. Various metrics can be used, alone or in conjunction with one another, to identify web pages as web spam. For example, a web page can be classified as "spam" if it has a large number of very long or very short words, a large number of words, an unusually low number of common words, and other attributes of the content that indicate that the page is likely designed to attract search engines rather than exist for its own merits. The outputs of the different metrics or filters can be fed into an intelligent filter, also referred to herein as a classifier, which uses weights to appropriately distinguish good pages from spam. Classifiers take an initial data set, called the training set, which is divided into positive and negative examples, and look at all features of the positive and negative examples in combination and attempt to obtain a dividing line, or more generally, a hyperplane or hypersurface that separates the positive examples from the negative examples (e.g., the spam from the non-spam). Once the classifier is sufficiently trained, it will be able to classify additional data points that were not in the training set by checking where they fall with respect to the dividing line.

In some examples, web spam detection techniques can be performed during the creation of a search engine index, rather than when a query is performed so as to not delay search results to a user. In other examples, web spam detection can be performed differently.

Some classes of spam web pages can be detected by analyzing the content of the page and looking for "unusual" properties, such as (1) the page contains unusually many words, (2) the page contains unusually many words within a <TITLE> HTML tag, (3) the ratio of HTML markup to visible text is low, (4) the page contains an unusually large number of very long or very short words, (5) the page contains repetitive content, (6) the page contains unusually few common words ("stop words"), or (7) the page contains a larger-than-expected number of popular n-grams (sequences of n words) for example. These metrics or filters can be input into a classifier for deciding whether or not a page is spam or determining the likelihood or probability that the page is spam, by comparing the outputs of one or more of the metrics, alone or in combination, to one or more thresholds, for example.

Content-based techniques are described for identifying spam pages. Specifically, metrics related to the content of an individual web page are used, and these metrics are correlated with the probability that a page is spam. Although a single metric may be used as a predictor (although each metric may have a number of false negatives and false positives), when combined the metrics become more precise. Any of a number of different classification algorithms, methods, or techniques may be used. Thus, using a classifier to combine the various metrics can result in greatly improved prediction accuracy. Various classification algorithms are well-known to one of ordinary skill in the art, and thus will not be described in detail. An example reference that describes the existing body of work in machine learning is "Pattern Classification" by Duda, Hart, and Stork, Wiley-Interscience, $2^{nd}$ edition, October 2000.

Once web spam has been detected, deletion, filtering, reduction of search engine rankings, or other actions may be performed. Software or hardware applications (e.g., computer programs, software, software systems, and other computing systems) can be used to implement techniques for evaluating content to detect web spam.

Exemplary Embodiments

FIG. 1 illustrates an example spam web page. Spam web pages ("web spam") may also include other forms of spam such as link spam, keyword stuffing, synthesizing addresses such as Uniform Resource Locators (URLs), but generally does not include e-mail spam. As an example, spam web page 10 includes keywords, search terms, and links, each of which can be generated by an SEO to enhance the ranking of a web site in a search results list from a search engine or the like. In this example, keywords, content, links, and synthetic URLs were generated to provide a mechanism for driving additional traffic to a destination web site. Here, a credit repair or loan agency's web site may be a destination site for spam web page 10. SEO techniques such as these may be detected and used to indicate the likelihood that particular content discovered by a search engine includes web spam.

Figure 2A:
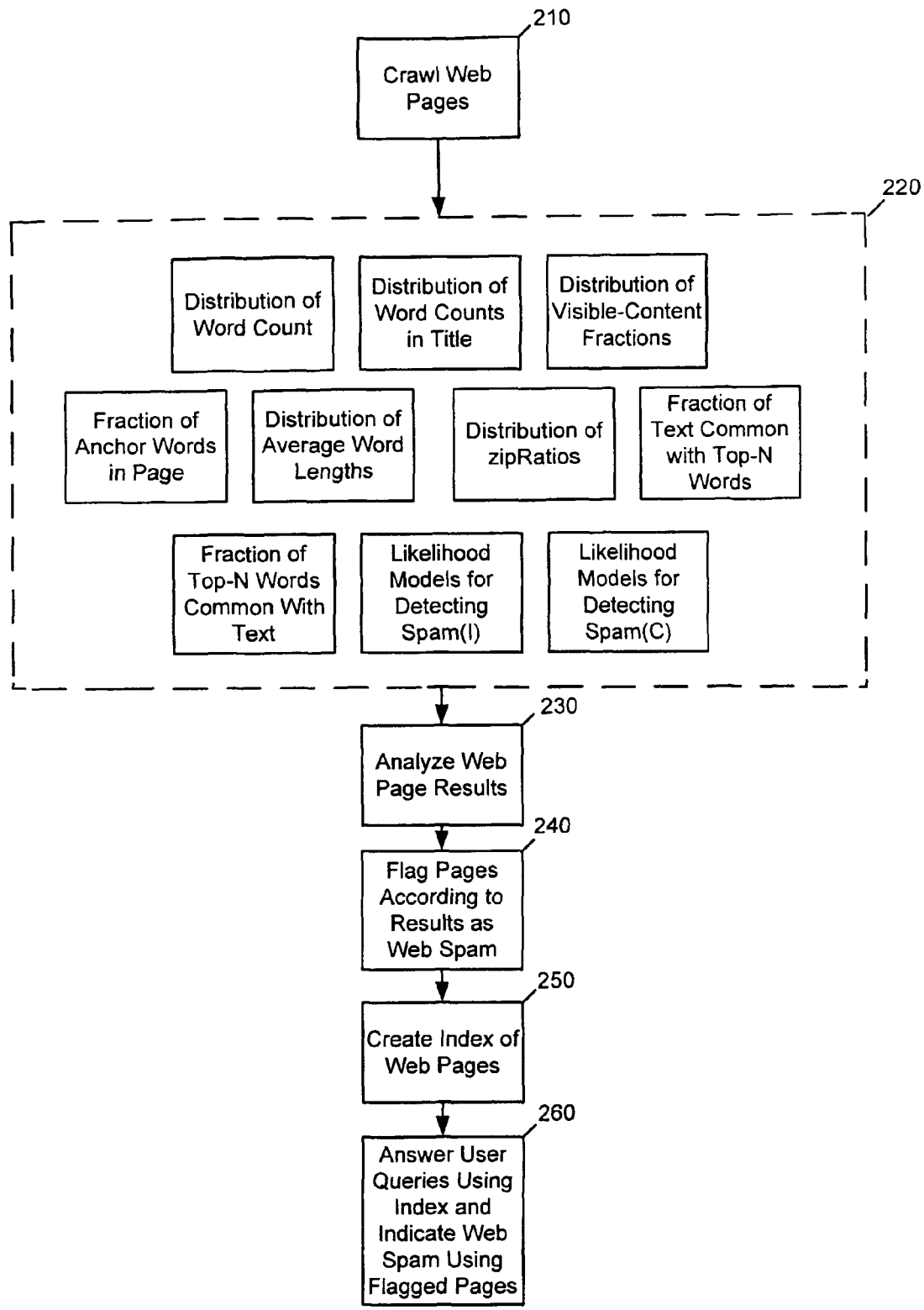
FIG. 2A is a flow chart of an exemplary method for evaluating content in accordance with the present invention.

FIG. 2A illustrates a flow chart of an exemplary method for evaluating content. Here, a process is provided for evaluating content to detect web spam. In this exemplary embodiment, a search engine receives contents by crawling a set of web pages at step 210. The crawled web pages are evaluated (via a processor, also referred to as a classifier) using one or more metrics at step 220. The result(s) of the metrics are compared against one or more thresholds to determine whether web spam is present (or likely present) at step 230. It should be noted that the threshold(s) can be, for example, predetermined or determined on the fly based on analyzed results. The more metrics indicate the presence of web spam, the higher the likelihood that the content is web spam.

Content identified as web spam is flagged or otherwise identified at step 240. Once web spam has been detected and flagged, a search index can be created for all pages crawled, including the web pages identified as web spam, at step 250.

In some examples, detected web spam may be excluded from a search engine index, may be given a low search ranking, or treated in a manner such that user queries are not affected or populated with web spam, thus generating more relevant search results in response to a subsequent query at step 260. Some exemplary metrics that may be used to determine whether web spam is associated with a web page are described in greater detail herein.

Figure 2B:
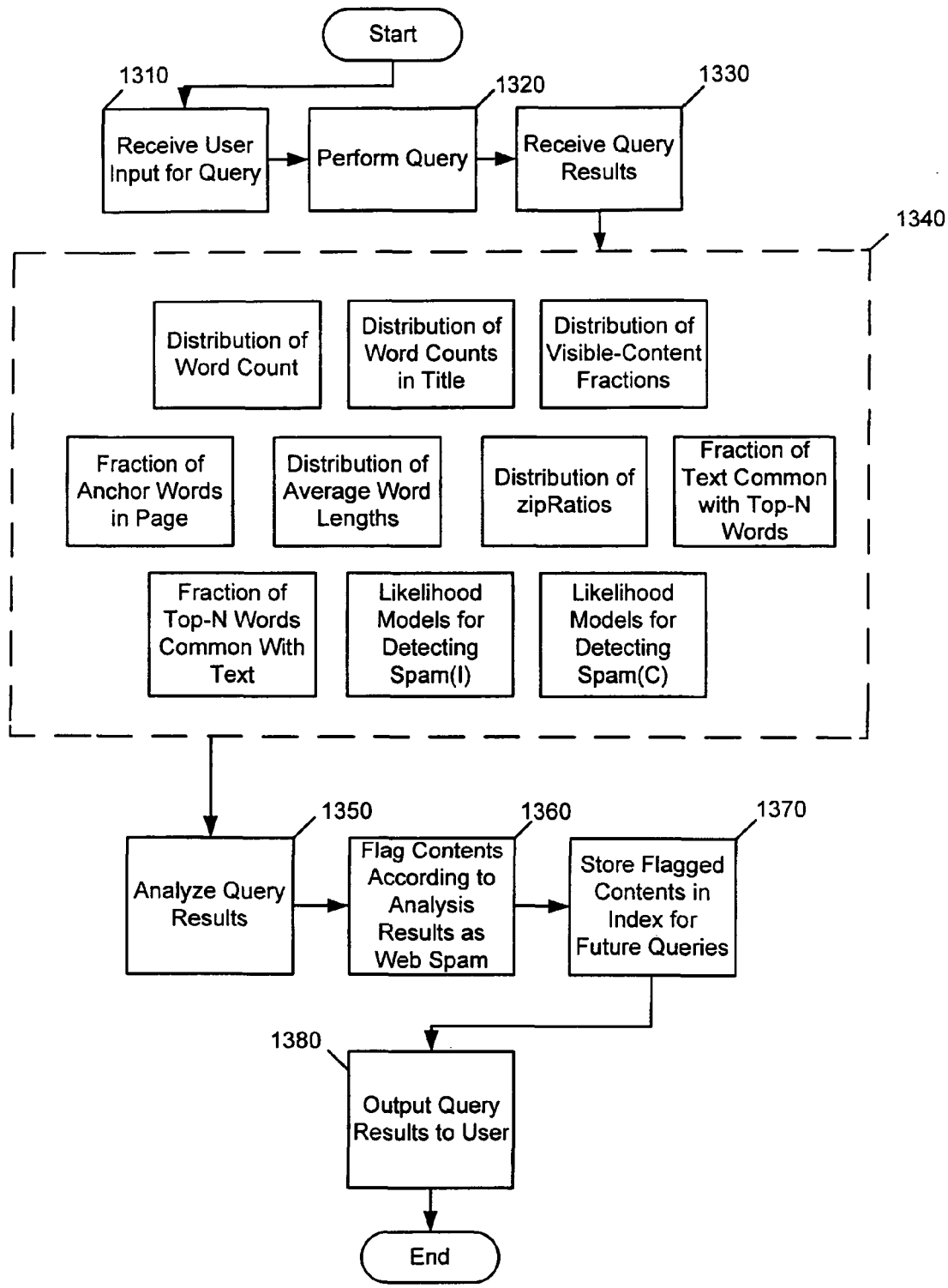
FIG. 2B is a flow chart of an exemplary method for evaluating content on the fly in accordance with the present invention.

FIG. 2B illustrates a flow chart of an exemplary method for evaluating content on the fly. In this exemplary embodiment, a search engine first receives user input to begin a particular query at step 1310. The search engine, thereafter, performs the query at step 1320. Once the query is performed, the search engine receives the query results at step 1330 and the search engine (or processor or classifier, for example) evaluates the results using various metrics in step 1340. After the query results are evaluated in step 1340, the search engine analyzes the evaluations at step 1350 and determines what contents are likely web spam.

Based on the analysis of step 1350, the search engine may identify web pages as web spam at step 1360 and may record or store the contents in an index for future queries at step 1370. The query results then can be output to the user at step 1380. Detected web spam may be excluded from a search engine index, given a low search ranking, or treated in a manner such that user queries are not affected or populated with web spam, thus generating more relevant search results in step 1380, or at least omitting some irrelevant results. Some examples of metrics and computing environments that may be used to determine whether web spam is associated with a web page are described in greater detail herein.

Figure 3:
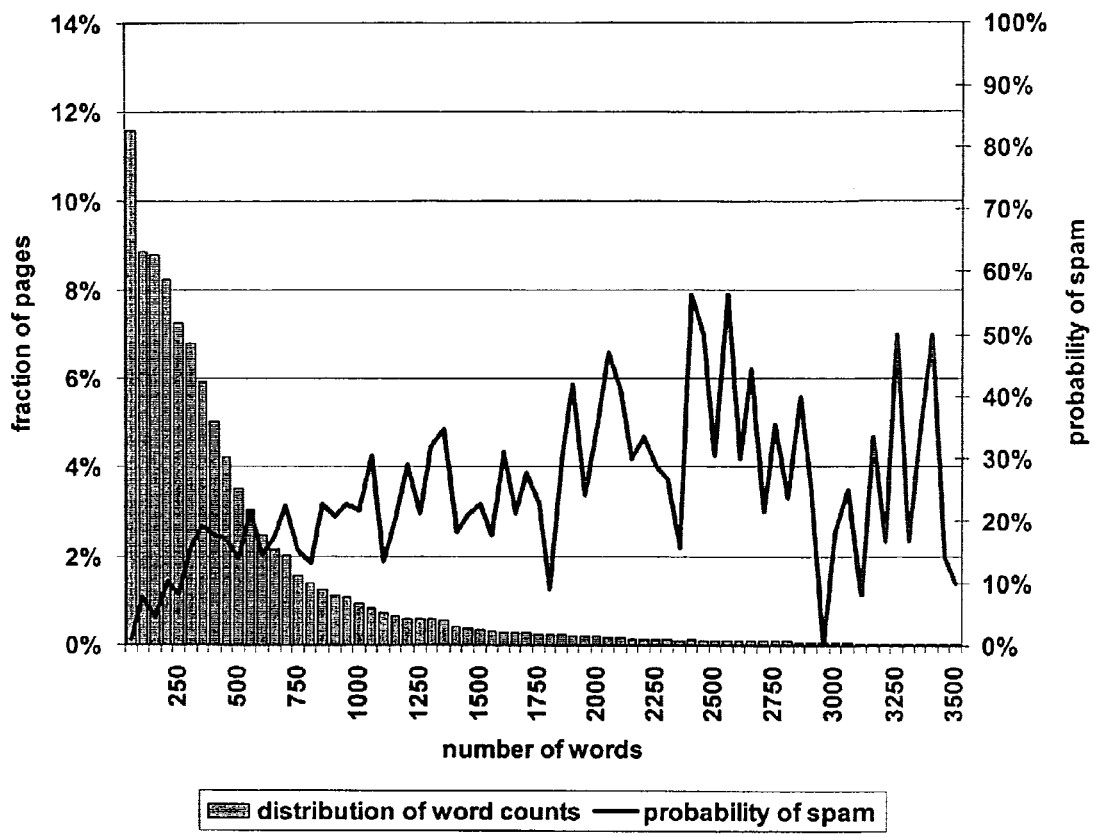
FIG. 3 illustrates an exemplary distribution of word counts.

In FIGS. 3 to 12, the horizontal axis shows a different content-based identification metric every time. In every drawing, the boxes depict the percentage of pages in the search engine corpus with the specified value regarding the identification metric. The percentages are measured by the left vertical axis. Additionally, in every drawing the probability of spam is depicted by a line and measured by the right vertical axis. FIG. 3 illustrates an exemplary distribution of word counts for detection of web spam. The distribution of word counts is but one of many exemplary metrics that can be used to evaluate whether a web page is web spam.

FIG. 3 reveals that as the number of words on a web page increases, the percentage of pages with that number of words decreases. The percentage of pages with a given number of words is depicted by the boxes and measured by the left vertical axis. FIG. 3 also shows that as the number of words on a page increases, the probability of spam being present on that page increases. The probability of spam is depicted by a line and measured by the right vertical axis. Thus, when the crawled web pages are evaluated using such a metric (e.g., in step 220), if the number of words of the web page fall above a threshold value, the web page can be identified as web spam pending the results of any other evaluations that may be based on additional metrics.

Figure 4:
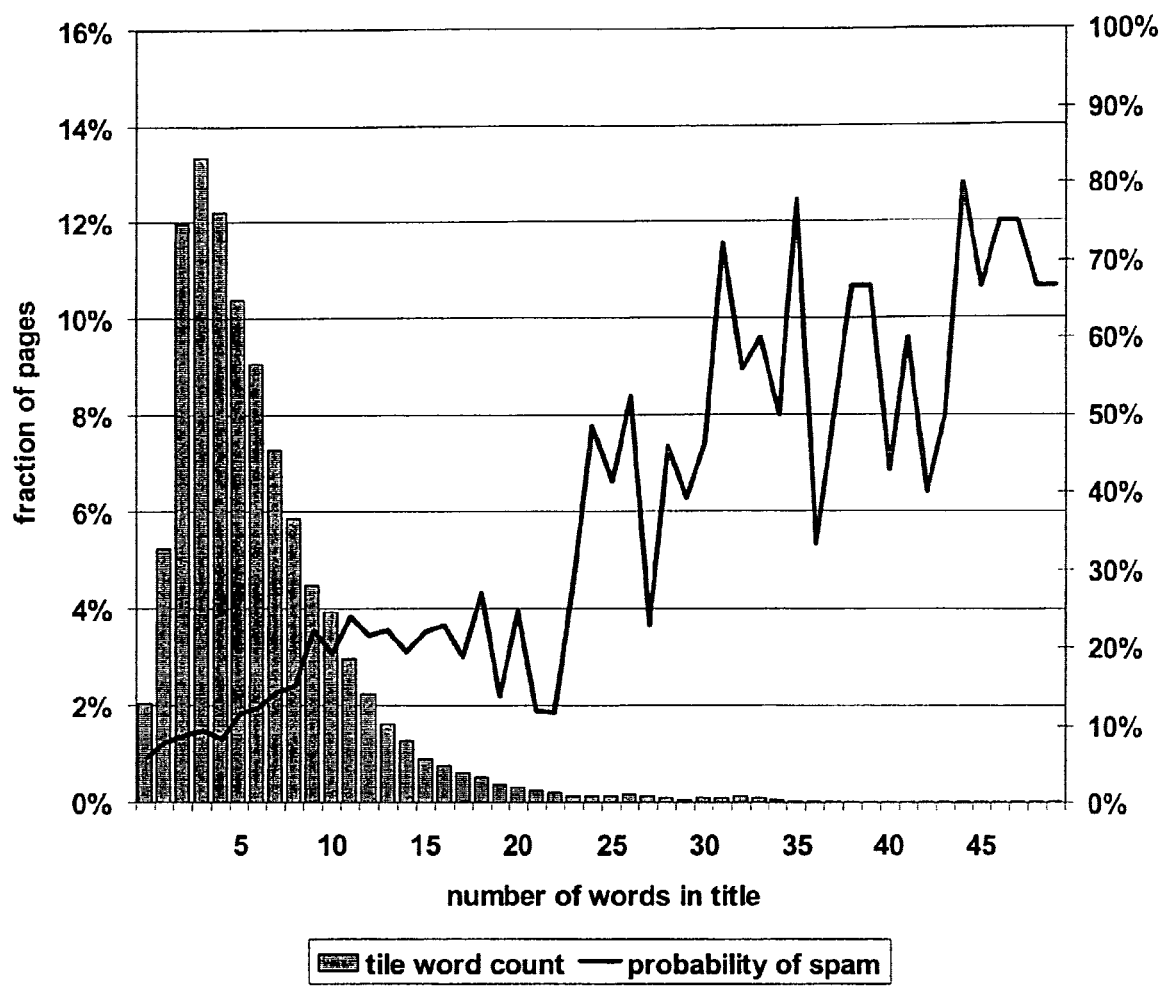
FIG. 4 illustrates an exemplary distribution of word counts in the title.

FIG. 4 illustrates an exemplary distribution of word counts in the title for detection of web spam. The number of words in the title of a web page can reveal whether web spam is present. As shown in the distribution in FIG. 4, as the number of words in the title of a web page increases, the probability of web spam being present dramatically increases. Therefore, when the crawled web pages are evaluated using such a metric (e.g., in step 220), if the number of words in the title of the web page falls above a threshold value, the web page can be identified as web spam pending the results of any other evaluations that may be based on additional metrics.

Figure 5:
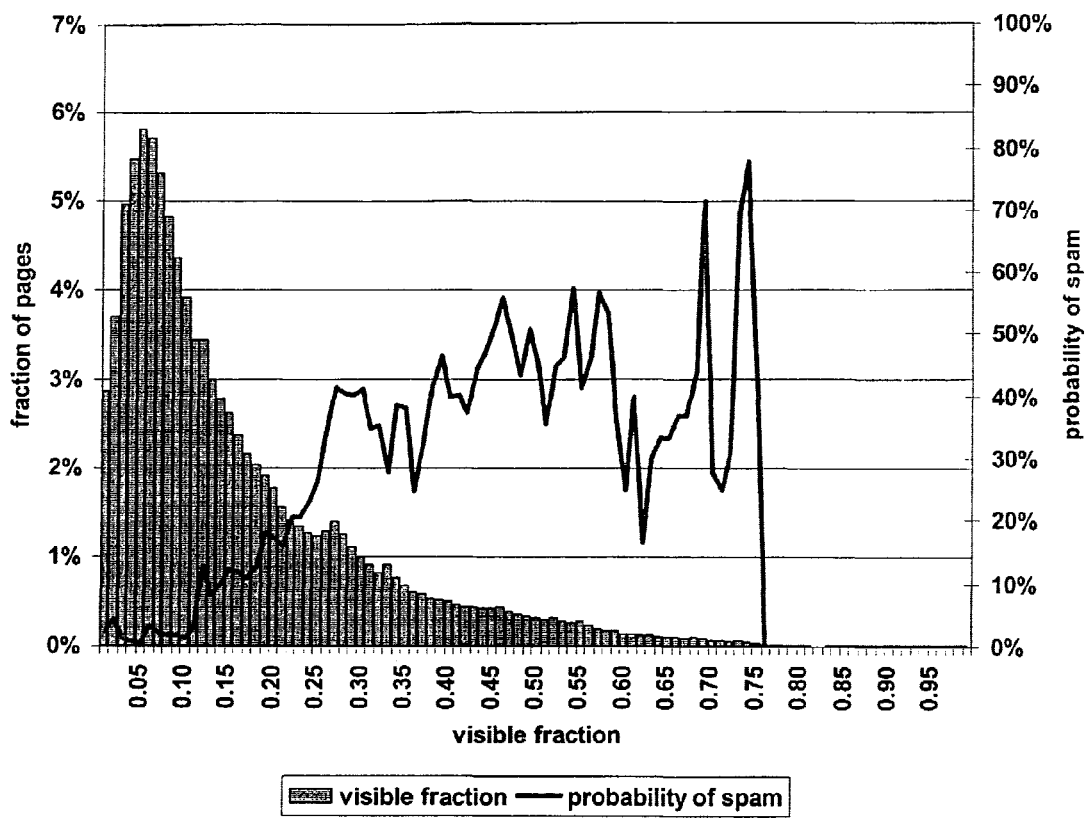
FIG. 5 illustrates an exemplary distribution of visible-content fractions.

FIG. 5 illustrates an exemplary distribution of visible-content fractions for detection of web spam. The visible content of a page is determined by dividing the size, in bytes, for example, of the visible words (that is, the words excluding the HTML markup, for example) present on a web page by the size, in bytes, for example, of the entire page. As illustrated in FIG. 5, as the visible content of the page increases, the probability of web spam being present increases to a point and then decreases dramatically. When the crawled web pages are evaluated using such a potential metric (e.g., in step 220), if the visible fraction of the web page lies within the higher probability of web spam, then the web page can be identified as web spam pending the results of any other evaluations that may be based on additional metrics.

Figure 6:
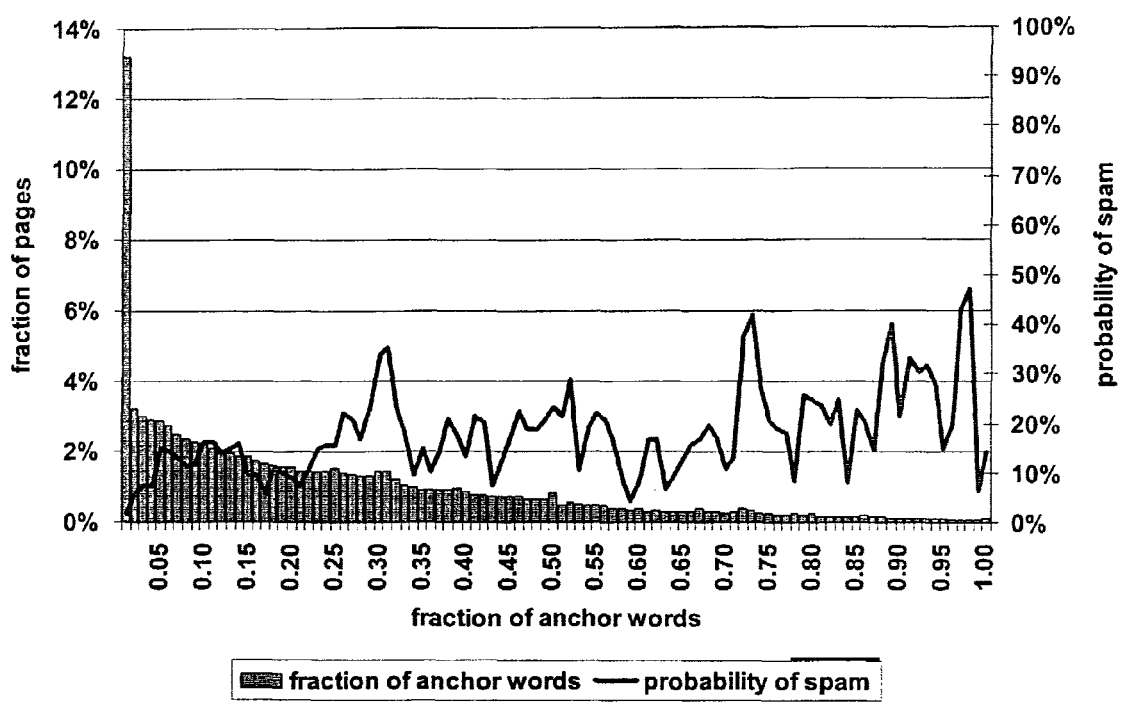
FIG. 6 illustrates an exemplary distribution of anchor-word fractions.

FIG. 6 illustrates an exemplary distribution of anchor-word fractions for detection of web spam. The fraction of anchor words, or hyperlinks, of a web page can be determined by dividing the number of anchor words by the total number of words on the page. As shown in FIG. 6, as the fraction of anchor words increases, the probability of web spam increases. Thus, when the crawled web pages are evaluated using such an anchor-word metric (e.g., in step 220), if the web page has a high anchor-word fraction, there is an increased likelihood of web spam and the web page can be identified as web spam pending the results of any other evaluations that may be based on additional metrics.

Figure 7:
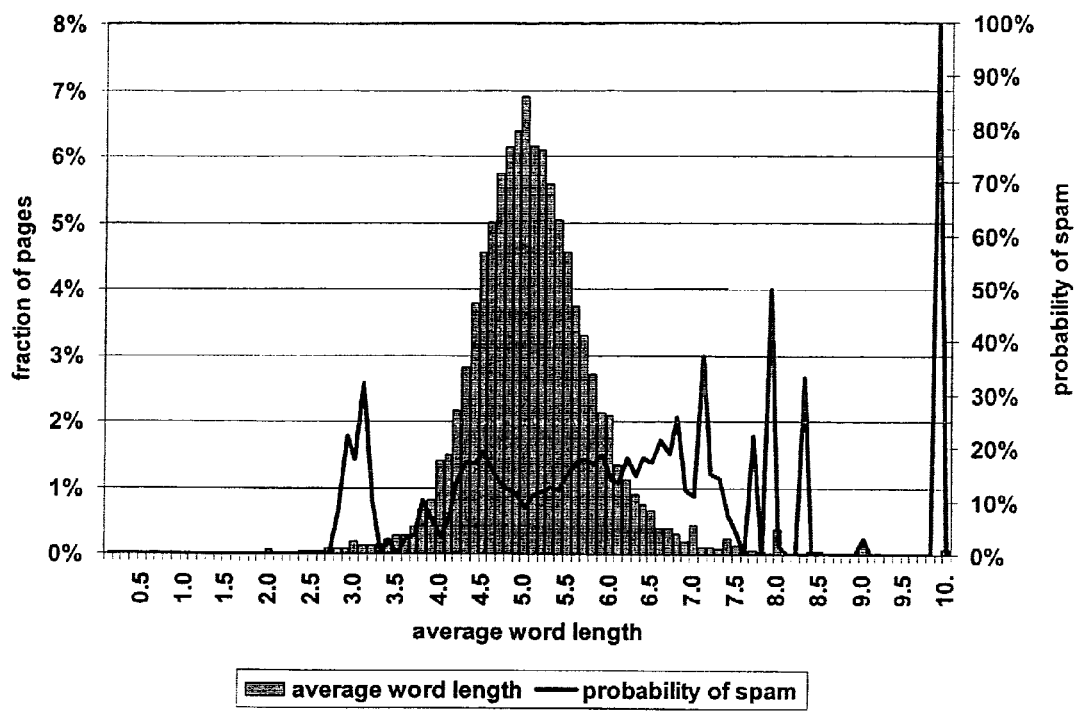
FIG. 7 illustrates an exemplary distribution of average word lengths.

FIG. 7 illustrates an exemplary distribution of average word lengths for use in the detection of web spam. Web spam is more likely to occur in web pages having very long or very short words. For example, FIG. 7 shows that the majority of web pages have an average word length between four (4) and six (6) characters. Web pages identified as web spam, however, likely fall outside that range having average word lengths less than four (4) characters or greater than six (6) characters. The numbers four and six are examples only, and any range of characters can be used as desired. If the web page is identified as web spam using such an exemplary average word length metric (e.g., in step 220), the web page can be flagged as web spam pending the results of any other evaluations that may be based on additional metrics.

Figure 8:
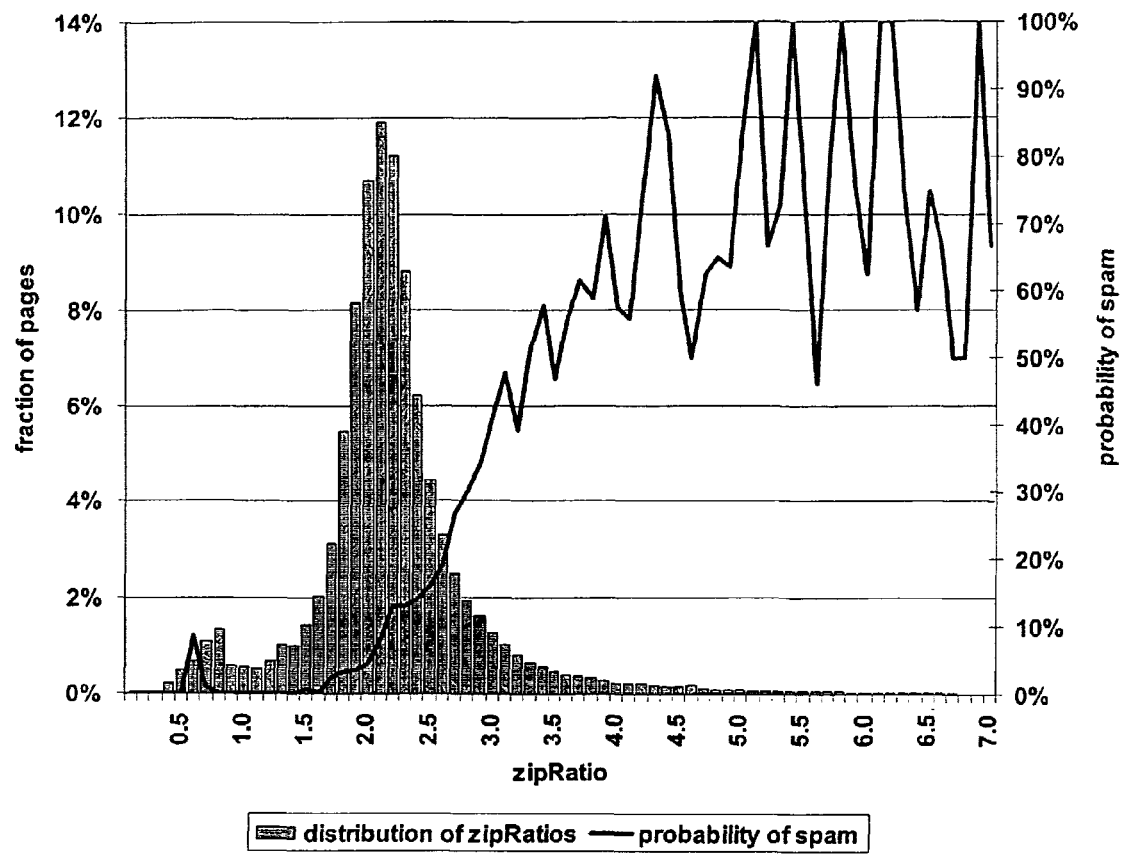
FIG. 8 illustrates an exemplary distribution of zipRatios.

FIG. 8 illustrates an exemplary distribution of zipRatios for use in the detection of web spam. The zipRatio of a page is determined by dividing the size (in bytes) of uncompressed visible text (that is, text other than HTML markup, for example) by the size (in bytes) of compressed visible text. As illustrated in FIG. 8, as the zipRatio of the page increases beyond a threshold (such as 2.0), the probably of web spam being present on a web pages increases dramatically. Therefore, when a crawled web page is evaluated using such a potential metric (e.g., in step 220), if the zipRatio of the web page lies above a threshold (e.g., 2.0 here), then the web page can be identified as web spam pending the results of any other evaluations that may be based on additional metrics.

Figure 9:
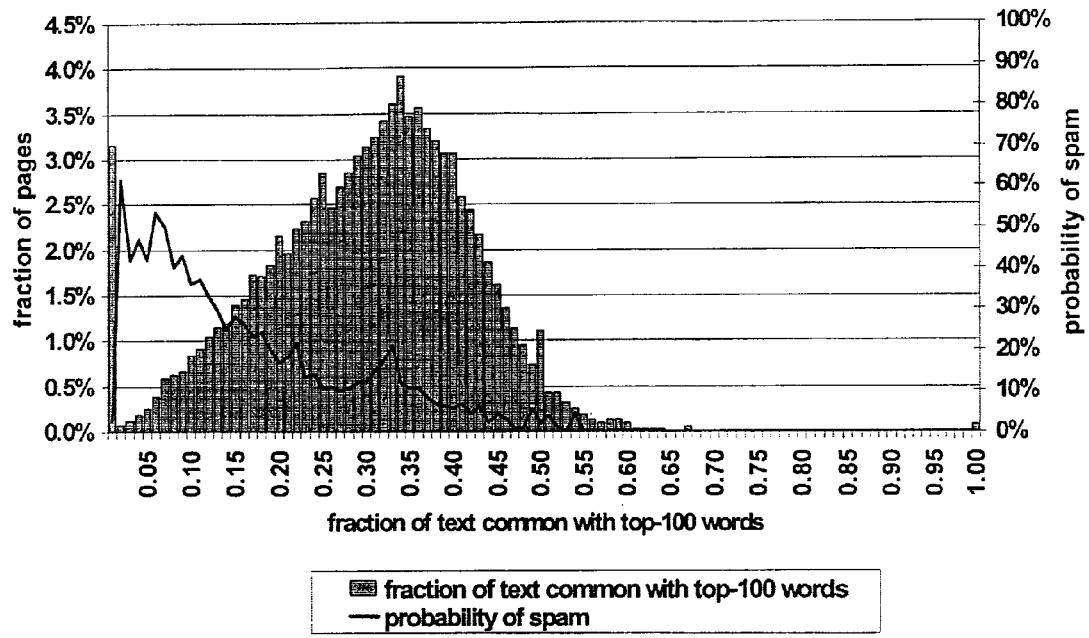
FIG. 9 illustrates an exemplary distribution for the fraction of words of every page common with the 100 most frequent words in the search engine corpus.

FIG. 9 illustrates an exemplary distribution for the fraction of the words on a given web page common with the 100 most popular words of a large search engine corpus (e.g., the lexicon of the English language, or all words indexed by a search engine). The fraction of words common with a set number of frequently used words is calculated by first identifying a set number (N) of words most frequently used on web pages. N may be, for example, the 100, 200, 500, or 1000, etc. most frequently used words. The fraction is then determined by dividing the number of words in common with the top N words by the total number of words on the page. For example, the 100 most common words in a very large corpus representative of the English language is determined, e.g., by examining all the English web pages downloaded by the crawler (the same applies to other languages as well). It is then determined what fraction of the words on a single web page is drawn from the 100 most frequent words in the entire corpus. For example, words like "the", "a", "from", etc. are among the 100 most frequent English words. If a web page had no occurrences of any of these words, but 100 occurrences of "echidna" (a spiny anteater and a rare word), it is determined that the page has 0% overlap with the top-100 words.

FIG. 9 illustrates that web spam is more likely found in web pages with few words in common with the top 100 words. Thus, when the crawled web pages are evaluated using such a potential metric (e.g., in step 220), if the fraction of words common with the top N words is unusually small, the web page can be identified as web spam pending the results of any other evaluations that may be based on additional metrics.

Figure 10:
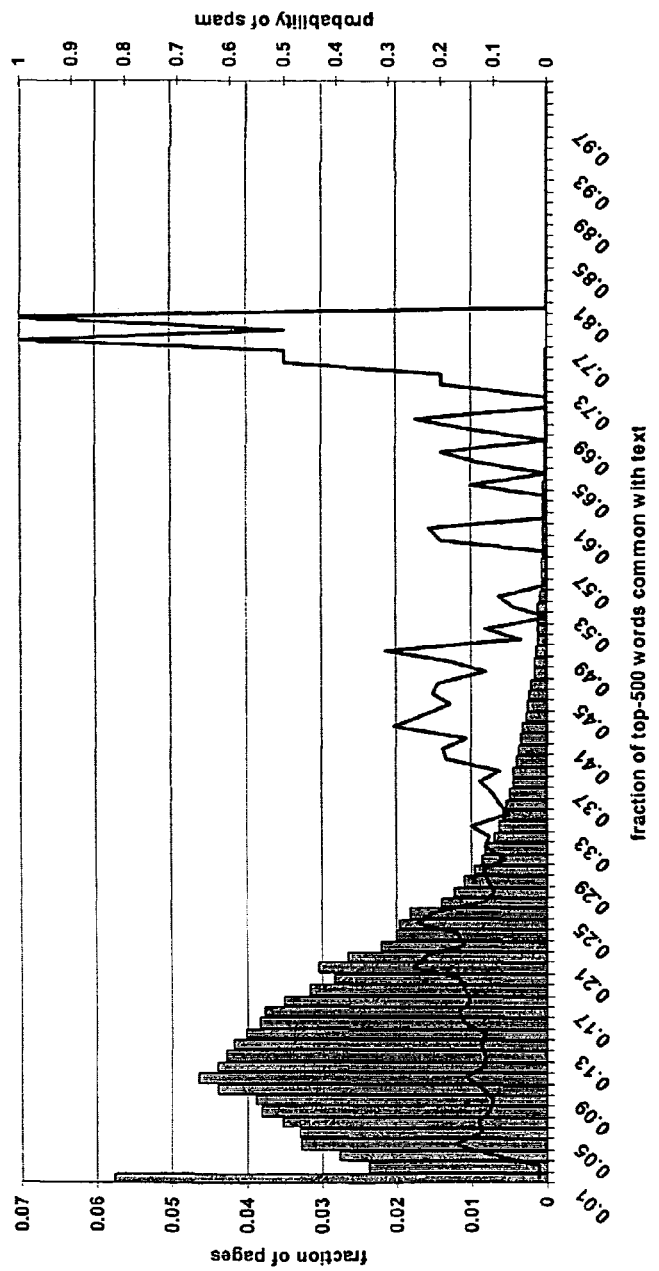
FIG. 10 illustrates an exemplary distribution for the fraction of the 500 most frequent words in the search engine corpus common with words of the page.

FIG. 10 illustrates an exemplary distribution for the fraction of the 500 most popular words of a large search engine corpus (e.g., the lexicon of the English language, or all words indexed by the search engine) common with the text of a given page. While the exemplary distribution depicted in FIG. 9 illustrates what fraction of the words on a given web page are contained within the most 100 most popular words of a large corpus, FIG. 10 illustrates what fraction of the 500 most popular words of a large corpus are contained on a given page.

For example, assume "a" is a popular English word and that it occurs many times within a very large corpus. With respect to the metric used in FIG. 9, if a web page contained just one word, and that word was "a", that web page would score 1 since 100% of the words on the web page were popular (i.e., within the most 100 most popular words). With respect to the metric used in FIG. 10, however, if a web page contained just one word, and that word was "a", that web page would score $\frac{1}{500}$ since only 1 of the 500 most popular words were contained in that web page. It is noted that 500 is an example value only, and any number of the most popular words (e.g., 100, 200, etc.) may be used.

Figure 11:
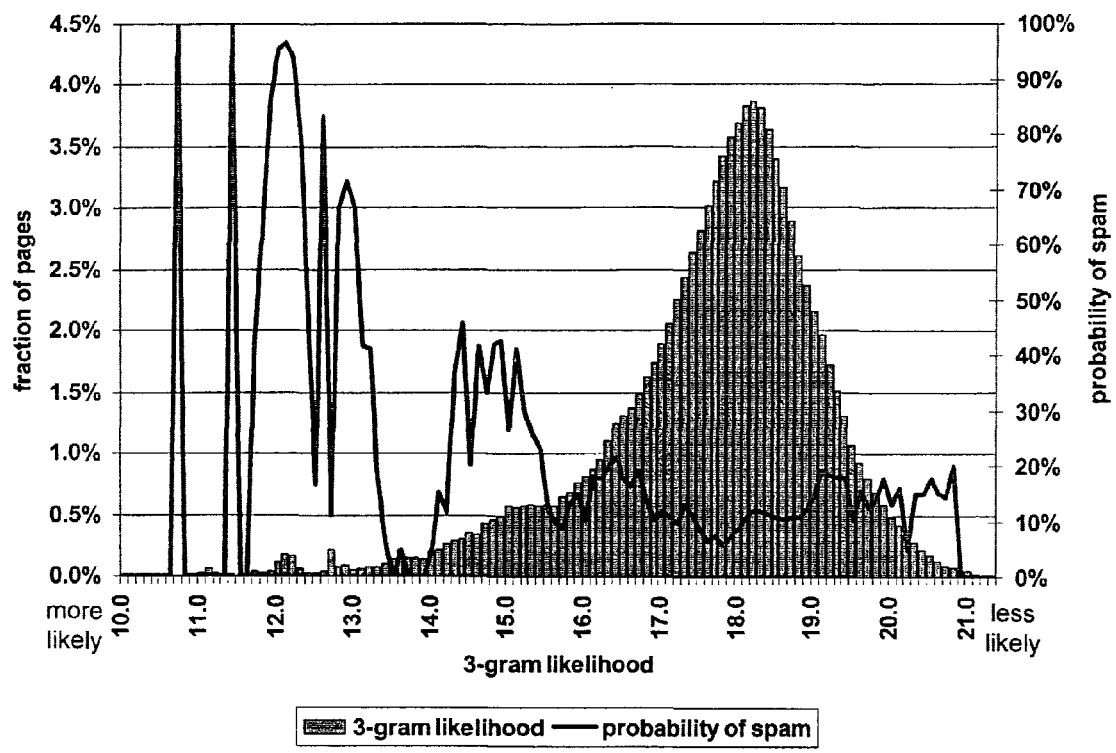
FIG. 11 illustrates an exemplary distribution of 3-gram likelihoods (independent)
Figure 12:
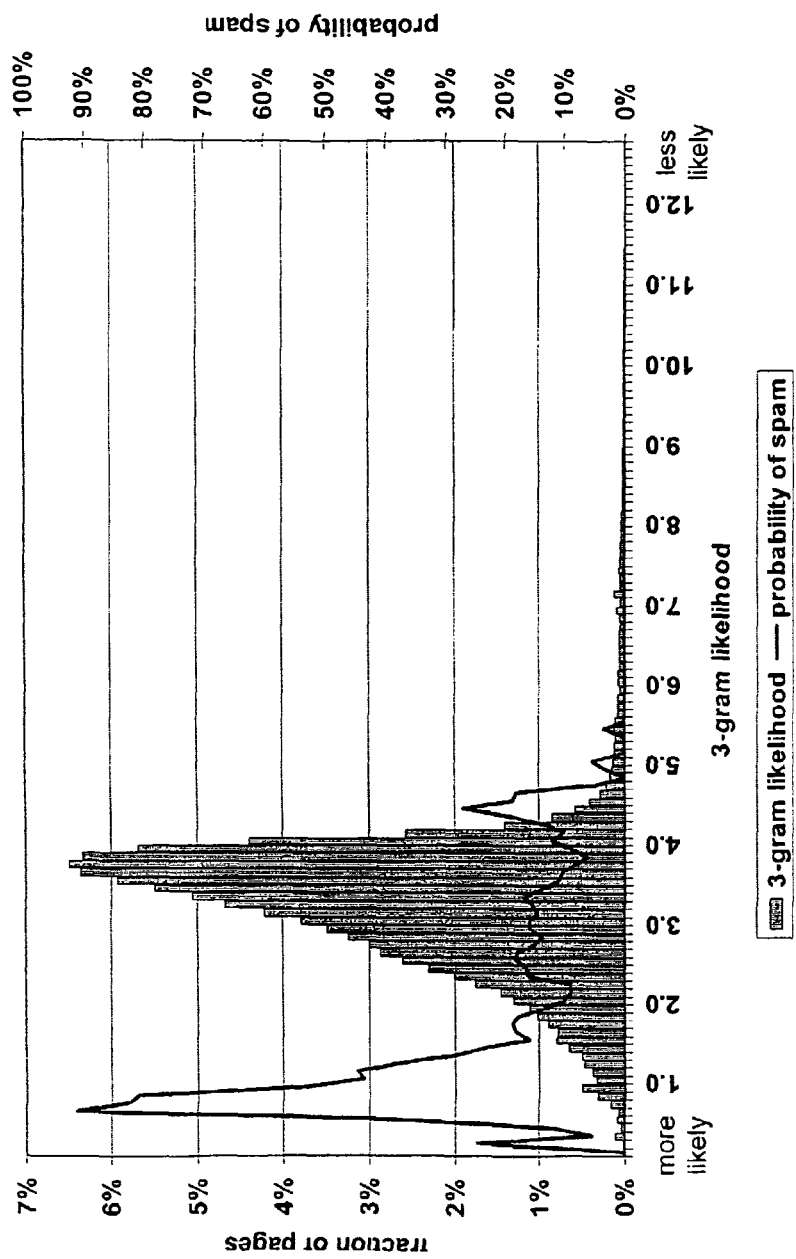
FIG. 12 illustrates an exemplary distribution of 3-gram likelihoods (conditional)

FIGS. 11 and 12 illustrate exemplary distributions of 3-gram likelihoods (independent) and 3-gram likelihoods (conditional) for use in the detection of web spam. Certain words in the English language (used in this example, though any language or set of characters is contemplated in accordance with the present invention) are commonly used to communicate information. Many times these words are grouped together to form phrases to further communicate information. Certain sequences of words are more likely than others to occur in English phrases. For example, the sequence of words "for the" is commonly used in the English language (e.g., "plutonium or highly enriched uranium are necessary ingredients for the creation of a nuclear weapon"), whereas the sequence of words "before against" is not commonly used for communication. In order to quantify this likelihood, sequences of n consecutive words, also known as n-grams, are examined. A document containing n+k−1 words comprises k overlapping n-grams. The probability that an n-gram occurs at a particular position in a document may be determined by taking a very large corpus (such as the set of all English web pages downloaded by the search engine) and dividing the number of occurrences of that n-gram in the corpus by the total number of n-grams in the corpus. The probability of the n-gram $w_1 \ldots w_n$ (where $w_1 \ldots w_n$ are n successive words) occurring at a particular position is denoted by $P(w_1 \ldots w_n)$. The probabilities of individual n-grams can be used to estimate the probability of entire documents. For example, the probability that a document with k+n−1 words $w_1 \ldots w_{k+n-1}$ occurs in the collection can be estimated by multiplying the probabilities of all successive n-grams:

$$P(w_1 \ldots w_n) \cdot P(w_2 \ldots w_{n+1}) \cdot \ldots \cdot P(w_k \ldots w_{k+n-1})$$

This estimate is called an independent likelihood because it makes the assumption that the probabilities of an n-gram occurring in a document is independent of the other n-grams. This assumption however may be unwarranted since n-grams overlap.

The estimate may be refined by examining the probability of a word occurring after a sequence of previous words has occurred. The probability of word $w_n$ occurring after words $w_1 \ldots w_{n-1}$ is denoted as $P(w_n|w_1 \ldots w_{n-1})$. Using this notation, the probability that a document with k+n−1 words $w_1 \ldots w_{k+n-1}$ occurs in the collection can be estimated by multiplying the conditional probabilities of all successive n-grams:

$$P(w_n|w_1 \ldots w_{n-1}) \cdot P(w_{+1}|w_2 \ldots w_n) \cdot \ldots \cdot P(w_{k+n-1}|w_k \ldots w_{k+n-2})$$

This estimate is called conditional likelihood. Because, in certain cases, the values of the above products can be too small to be handled by a computer, the products can be alternatively represented as the sum of the negative logarithms of the individual probabilities. Additionally, the two probabilistic metrics can be improved to be insensitive to the number of words in a document, by dividing the sum of the logarithms by the number of n-grams in the document. This results in the following two metrics for the independent likelihood and the conditional likelihood, respectively, of a document with words $w_1 \ldots w_{k+n-1}$:

$$IndepLH = -\frac{1}{k}\sum_{i=0}^{k-1} \log P(w_{i+1} \ldots w_{i+n})$$

$$CondLH = -\frac{1}{k}\sum_{i=0}^{k-1} \log P(w_{i+n} | w_{i+1} \ldots w_{i+n-1}).$$

If the independent or conditional n-gram likelihood of a web page is above a certain threshold, the web page can be identified as web spam pending the results of any other evaluations that may be based on additional metrics.

Exemplary Computing Environment

Figure 13:
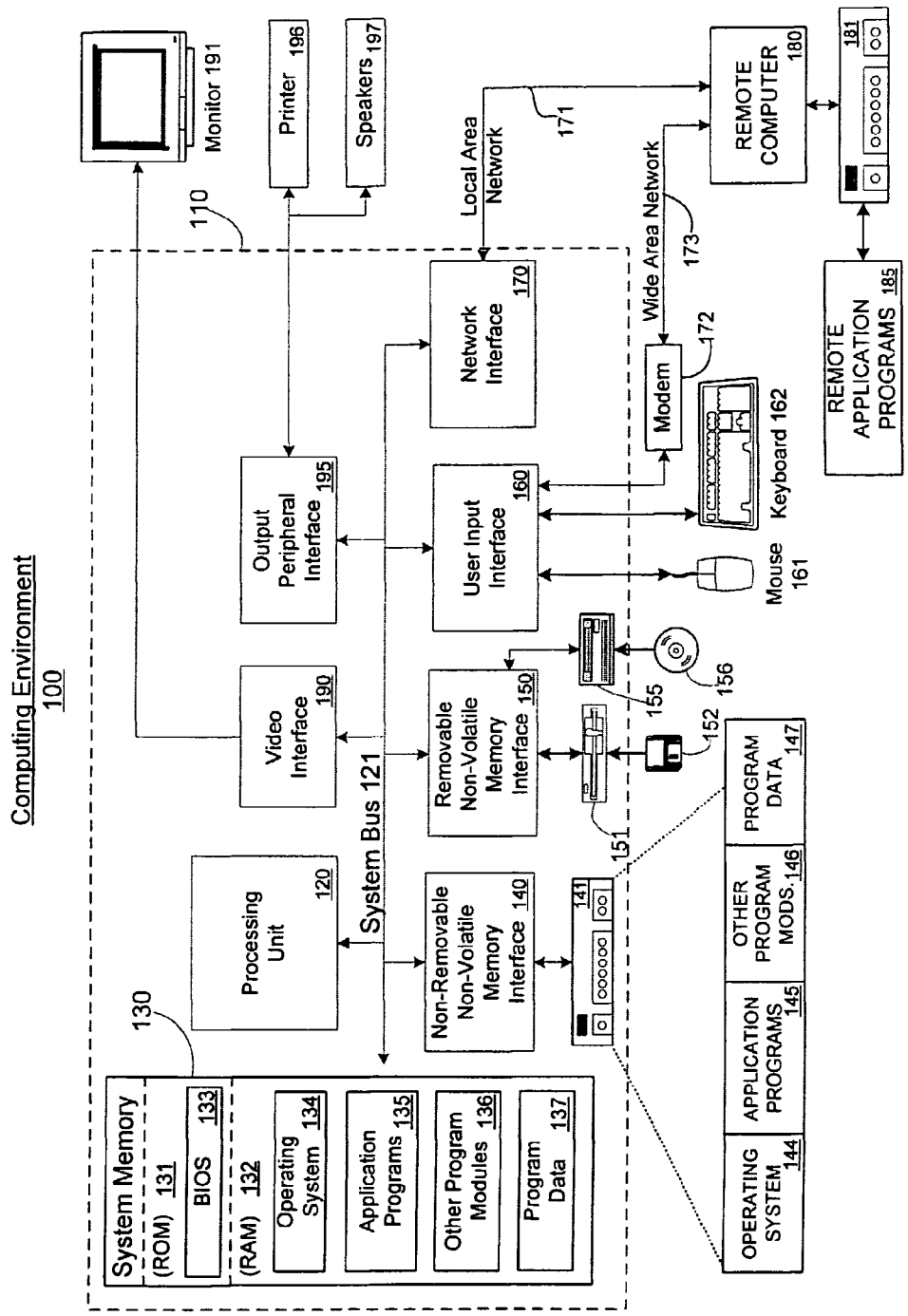
FIG. 13 is a block diagram showing an example computing environment in which aspects of the invention may be implemented.

FIG. 13 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 13 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 13, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 13 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 13 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 13 provide storage of computer readable instructions, data structures, program modules and other data for the computer 110. In FIG. 13, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 13. The logical connections depicted in FIG. 13 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 13 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed:

1. A method comprising:
   receiving content by crawling a web page;
   analyzing the content for web spam using a content-based identification technique,
   wherein the content-based identification technique comprises at least one of:
     determining a fraction of visible content to total content on the web page; or
     determining a ratio of compressed visible content to uncompressed visible content on the web page; and
   classifying the content according to said analysis.

2. The method of claim 1, further comprising:
   creating an entry of the web page in an index associated with the classified content, wherein the entry comprises an identifier of the web page and an indication of whether the web page is web spam; and
   using the index to filter web spam from a result set computed for a received query.

3. The method of claim 2, wherein using the index comprises comparing the index against the result set computed for the received query.

4. The method of claim 3, further comprising blocking a result from the result set based on the index associated with the analyzed and classified content.

5. The method of claim 3, further comprising adjusting a ranking of a result from the result set based on the index associated with the analyzed and classified content.

6. The method of claim 1, further comprising crawling a set of web pages to obtain the content, wherein the content comprises an item from each of the web pages in the set of web pages being crawled.

7. A system for identifying web spam, the system comprising:
   a storage device configured to store an index; and
   a processor configured to:
     receive content from a crawled web page;

analyze the content using a content-based identification technique to determine whether web spam is present, wherein the content-based identification technique comprises at least one of:
  determining a fraction of visible content to total content on the web page; or
  determining a ratio of compressed visible content to uncompressed visible content on the web page; and
classify the content according to said analysis.

8. The system of claim 7, wherein the content-based identification technique further comprises using an additional metric.

9. The system of claim 8, wherein said processor further:
compares the classified content to a threshold to determine if the content is web spam; and
creates an entry of the web page in the index, the entry comprising an identifier of the web page and an indication whether the web page is web spam.

10. The system of claim 9, wherein the threshold is predetermined or determined based on analyzed results.

11. The system of claim 7, wherein the index stored in said storage device is used to filter web spam from a result set computed for a received query.

12. The system of claim 11, wherein the processor further:
compares the index against the result set computed for the received query; and
blocks a result from the result set based on the index.

13. A computer-readable storage medium comprising computer-executable instructions stored thereon, wherein the computer-executable instructions, when executed by a computer, cause performance of acts, the acts comprising:
receiving a set of web pages in response to a query;
analyzing content of the set of web pages for web spam by using a content-based identification technique comprising at least one of:
  determining a fraction of visible content to total content on the web page; or
  determining a ratio of compressed visible content to uncompressed visible content on the web page; and
classifying the content according to said analysis.

14. The computer-readable storage medium of claim 13, further comprising computer-executable instructions for creating an index for analyzing a future query.

15. The method of claim 1, wherein analyzing the content for web spam using a content-based identification technique comprises scanning the content of the web page for a plurality of additional metrics associated with the content, wherein each of the additional metrics is correlated with a probability that the web page is web spam.

16. The system of claim 7, wherein, during the analysis of the content for web spam, the processor scans the content of the crawled web page for a plurality of additional metrics associated with the content, wherein each of the additional metrics is correlated with a probability that the web page is web spam.

17. The method of claim 1, wherein the content-based identification technique further comprises determining an average word length from amongst a plurality of words contained in the web page, and determining if the average word length falls outside an expected range of values.

18. The method of claim 17, wherein the expected range of values comprises a low end average word length value and a high end average word length value, the low end average word length value defined by a first number of characters, and the high end average word length value defined by a second number of characters, the second number of characters being larger than the first number of characters.

19. The system of claim 7, wherein the content-based identification technique further comprises determining an average word length from amongst a plurality of words contained in the web page, and determining if the average word length falls outside an expected range of values.

20. The computer-readable storage medium of claim 13, wherein the content-based identification technique further comprises determining an average word length from amongst a plurality of words contained in the web page, and determining if the average word length falls outside an expected range of values.

* * * * *